(12) United States Patent
Moon et al.

(10) Patent No.: US 10,853,723 B2
(45) Date of Patent: Dec. 1, 2020

(54) NEURAL NETWORK TRAINING METHOD AND APPARATUS, AND DATA PROCESSING APPARATUS

(71) Applicant: Samsung Electronics Co., Ltd., Suwon-si (KR)

(72) Inventors: Taesup Moon, Seoul (KR); Yeha Lee, Hwaseong-si (KR); Heeyoul Choi, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 512 days.

(21) Appl. No.: 14/636,684

(22) Filed: Mar. 3, 2015

(65) Prior Publication Data

US 2016/0026913 A1    Jan. 28, 2016

(30) Foreign Application Priority Data

Jul. 24, 2014 (KR) .................. 10-2014-0094108

(51) Int. Cl.
*G06N 3/04* (2006.01)
*G06N 3/08* (2006.01)

(52) U.S. Cl.
CPC .................. *G06N 3/08* (2013.01); *G06N 3/04* (2013.01); *G06N 3/082* (2013.01); *G06N 3/0445* (2013.01)

(58) Field of Classification Search
CPC .......... G06N 3/08; G06N 3/049; G06N 3/063; G06N 3/04; G06N 3/082; G06N 3/0445
USPC ......................................... 706/30
See application file for complete search history.

(56) References Cited

U.S. PATENT DOCUMENTS

| 7,647,284 | B2 | 1/2010 | Prokhorov |
| 7,716,148 | B2 | 5/2010 | Meng et al. |
| 7,835,999 | B2 | 11/2010 | Block |
| 7,953,683 | B2 | 5/2011 | Minamino et al. |
| 2003/0065632 | A1* | 4/2003 | Hubey ............... G06K 9/6218 706/15 |
| 2013/0148879 | A1 | 6/2013 | Nobuta et al. |
| 2013/0204815 | A1 | 8/2013 | Grothmann et al. |

(Continued)

FOREIGN PATENT DOCUMENTS

| KR | 10-0274579 B1 | 12/2000 |
| KR | 2002-0017110 A | 3/2002 |

(Continued)

OTHER PUBLICATIONS

Dropout: A simple way to prevent neural networks from overfitting. Srivastava et al. Journal of Machine learning. Published Jun. 2014.*

(Continued)

*Primary Examiner* — Lut Wong
(74) *Attorney, Agent, or Firm* — NSIP Law (57) ABSTRACT

A neural network training method based on training data, includes receiving training data including sequential data, and selecting a reference hidden node from hidden nodes in a neural network. The method further includes training the neural network based on remaining hidden nodes obtained by excluding the reference hidden node from the hidden nodes, and based on the training data, the remaining hidden nodes being connected with hidden nodes in a different time interval, and a connection between the reference hidden node and the hidden nodes in the different time interval being ignored.

21 Claims, 6 Drawing Sheets

(56) References Cited

U.S. PATENT DOCUMENTS

2014/0180986 A1    6/2014  Hinton et al.
2015/0371132 A1*  12/2015  Gemello .................. G06N 3/04
                                                        706/20

FOREIGN PATENT DOCUMENTS

| KR | 2002-0085900 A   | 11/2002 |
|----|------------------|---------|
| KR | 10-0442434 B1    | 7/2004  |
| KR | 10-0820723 B1    | 4/2008  |
| KR | 10-1210380 B1    | 12/2012 |
| KR | 10-2014-0025702 A | 3/2014 |

OTHER PUBLICATIONS

Wikipedia ("Boltzmann machine" 2017).*
Goodfellow et al ("Joint Training of Deep Boltzmann Machines for Classification" May 2013).*
Pham et al ("Dropout improves Recurrent Neural Networks for Handwriting Recognition" Mar. 2014).*
Bayer et al ("On Fast Dropout and its Applicability to Recurrent Networks" Mar. 2014) (Year: 2014).*
Bayer, Justin, et al. "On Fast Dropout And Its Applicability To Recurrent Networks." *arXiv preprint arXiv:1311.0701* (2013). (12 pages, in English).
Extended European Search Report dated Dec. 13, 2016 in counterpart European Application No. 15176946.0 (9 pages, in English).
Pham, Vu, et al. "Dropout Improves Recurrent Neural Networks For Handwriting Recognition." *Frontiers in Handwriting Recognition (ICFHR), 2014 14th International Conference on*. IEEE, 2014. (6 pages, in English).
Hinton, Geoffrey E., et al. "Improving neural networks by preventing co-adaptation of feature detectors." arXiv preprint arXiv:1207.0580 v1 (2012). (18 pages, in English).
Pham, Vu, et al. "Dropout improves recurrent neural networks for handwriting recognition." arXiv preprint arXiv:1312.4569 v2 (2014). (6 pages, in English).

* cited by examiner

NEURAL NETWORK TRAINING METHOD AND APPARATUS, AND DATA PROCESSING APPARATUS

CROSS-REFERENCE TO RELATED APPLICATION

This application claims the benefit under 35 USC 119(a) of Korean Patent Application No. 10-2014-0094108, filed on Jul. 24, 2014, in the Korean Intellectual Property Office, the entire disclosure of which is incorporated herein by reference for all purposes.

BACKGROUND

1. Field

The following description relates to a neural network training method, a neural network training apparatus, and a data processing apparatus.

2. Description of Related Art

As a method of solving an issue of classifying an input pattern into a predetermined group, research is being actively conducted on applying an efficient pattern recognition method owned by a human to a computer. One form of ongoing research is related to an artificial neural network obtained by modeling biological characteristics of a human nerve cell through a mathematical expression. To solve the issue, the artificial neural network may use an algorithm constructed based on a human ability to learn. Based on the algorithm, the artificial neural network may generate a map between an input pattern and an output pattern, and the generating may indicate that the artificial neural network has a learning ability. Also, the artificial neural network may have a generalization ability and thus, may generate a relatively correct output with respect to an input pattern unused in a learning process based on a result of learning.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a neural network training method based on training data, the method including receiving training data including sequential data, selecting a reference hidden node from hidden nodes in a neural network, and training the neural network based on remaining hidden nodes obtained by excluding the reference hidden node from the hidden nodes, and based on the training data, the remaining hidden nodes being connected with hidden nodes in a different time interval, and a connection between the reference hidden node and the hidden nodes in the different time interval being ignored.

The reference hidden node may be excluded during the training of the neural network based on an item of the sequential data.

The selecting may include randomly selecting the reference hidden node from the hidden nodes.

The selecting may include randomly selecting another reference hidden node from the hidden nodes in response the training of the neural network based on an item of the sequential data being terminated, and the training may include training the neural network based on another item of the sequential data, and based on remaining hidden nodes obtained by excluding the other reference hidden node from the hidden nodes.

The sequential data may include any one or any combination of voice data, image data, biometric data, and handwriting data.

The method may further include updating a connection weight applied to the neural network based on a result of the training.

The training may include controlling the neural network to repetitively learn the training data based on a predetermined number of repetitions.

The neural network may be a recurrent neural network, and may include hidden layers.

A non-transitory computer-readable storage medium may include a program including instructions to cause a computer to perform the method.

In another general aspect, there is provided a neural network training method based on training data, the method including receiving training data including sequential data, selecting a reference hidden node from hidden nodes in a neural network, and training the neural network by excluding the reference hidden node from the hidden nodes during the training of the neural network based on an item of the sequential data.

Remaining hidden nodes obtained by excluding the reference hidden node from the hidden nodes may be connected with hidden nodes in a different time interval, and a connection between the reference hidden node and the hidden nodes in the different time interval may be ignored.

The selecting may include randomly selecting another reference hidden node from the hidden nodes in response the training of the neural network based on the item of the sequential data being terminated, and the training may include training the neural network based on another item of the sequential data, and based on remaining hidden nodes obtained by excluding the other reference hidden node from the hidden nodes.

In still another general aspect, there is provided a neural network training apparatus based on training data, the apparatus including a training data storage configured to store training data including sequential data, and a neural network trainer configured to train a neural network by excluding a reference hidden node from hidden nodes in the neural network during the training of the neural network based on an item of the sequential data.

The neural network training unit may be configured to train the neural network by excluding another reference hidden node from the hidden nodes during the training of the neural network based on another item of the sequential data, in response to the training of the neural network based on the item of the sequential data being terminated.

In yet another general aspect, there is provided a data processing apparatus including a trainer configured to train a neural network by excluding a reference hidden node from hidden nodes in the neural network during the training of the neural network based on an item of sequential data.

Connections between the reference hidden node and nodes in an upper layer may be ignored.

Connections between the reference hidden node and nodes in a subsequent time interval may be ignored.

The trainer may be configured to train the neural network by excluding an identical reference hidden node from hidden nodes in each time interval during the training of the neural network based on the item of the sequential data.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Figure 1:
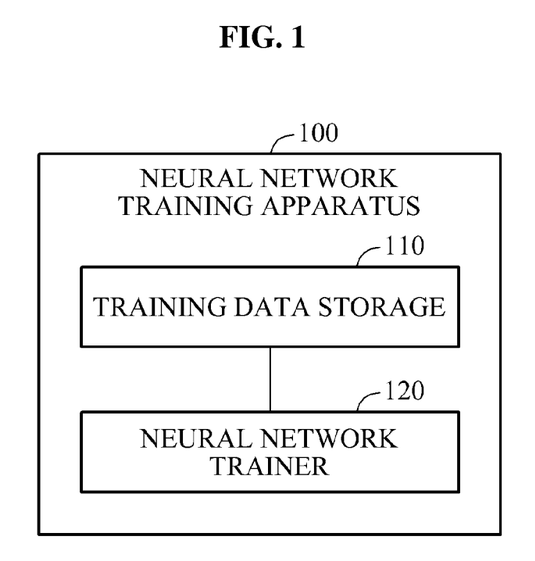
FIG. 1 is a diagram illustrating an example of a neural network training apparatus.

FIG. 1 is a diagram illustrating an example of a neural network training apparatus 100. The neural network training apparatus 100 trains a neural network or an artificial neural network. The neural network may be a recognition model implemented through software or hardware imitating a computing ability of a biological system by using numerous artificial neurons connected through a connection line.

The recognition model of the neural network may recognize sequential data, and be used in fields of, for example, voice recognition, image recognition, body state recognition, and handwriting recognition. The sequential data may refer to data having a temporality or a sequence such as voice data, image data, biometric data, handwriting data, and/or other types of data. For example, the recognition model of the neural network may recognize contents in input voice data or a figure appearing in an image. Also, the recognition model of the neural network may recognize a body state of a user by analyzing a biometric signal such as an electrocardiogram (ECG), an electroencephalogram (EEG), and/or another type of signal, and recognize a handwriting input by analyzing a gesture of the user. As an example, the recognition model of the neural model may be used to estimate an appropriate deoxyribonucleic acid (DNA) sequence based on an observed signal in a DNA sequencing device.

Artificial neurons having simplified biological functions of a neuron may be used in the neural network, and may be mutually connected through a connection line having a connection weight. The connection weight may be a predetermined value of the connection line, and may also be expressed as connection strength. The neural network may perform a human cognitive function or a training process using the artificial neurons. An artificial neuron may also be referred to as a node.

The neural network may include a plurality of layers. For example, the neural network may include an input layer, a hidden layer, and an output layer. The input layer may receive an input to perform training, and transfer the received input to the hidden layer. The output layer may generate an output of the neural network based on a signal received from nodes of the hidden layer. The hidden layer may be disposed between the input layer and the output layer to change training data transferred through the input layer to an easily predicted value. Nodes included in the input layer and the hidden layer may be mutually connected through a connection line having a connection weight, and nodes included in the hidden layer and the output layer may be mutually connected through a connection line having a connection weight. Each of the input layer, the hidden layer, and the output layer may include a plurality of nodes.

The neural network may include a plurality of hidden layers. The neural network including the plurality of hidden layers may be referred to as a deep neural network, and training of the deep neural network may be referred to as a deep learning. A node included in the hidden layer may be referred to as a hidden node. An output of a hidden node in a previous time interval may be connected with hidden nodes of a current time interval. Also, an output of the hidden node in the current time interval may be connected with hidden nodes of a subsequent time interval. A neural network having a recurrent connection among hidden nodes of different time intervals may be referred to as a recurrent neural network.

The neural network training apparatus 100 may train the neural network through a supervised learning. The supervised learning may be a method of inputting training data and output data corresponding to the training data to the neural network, and updating connection weights of connection lines, thereby outputting the output data corresponding to the training data. For example, the neural network training apparatus 100 may update a connection weight among artificial neurons through backpropagation learning, a delta rule, and/or other methods known to one of ordinary skill in the art.

The backpropagation learning may be a method of estimating an error by performing forward computation on training data, and propagating the estimated error by inversely proceeding in a direction from an output layer through a hidden layer to an input layer, thereby updating a connection weight to reduce the error. A neural network processing may be performed in a direction from an input layer through a hidden layer to an output layer. Conversely, in a process of the backpropagation learning, a connection weight update may be performed in a direction from an output layer through a hidden layer to an input layer.

The neural network training apparatus 100 may define an objective function to measure a closeness to an optimization for currently set connection weights, change the connection weights based on a result of the objective function, and perform training repetitively. For example, the objective function may be an error function for computing an error between an expectation value corresponding to a desired output and an actual output value output by the neural network based on training data. The neural network training apparatus 100 may update the connection weights to reduce a value of the error function.

Referring to FIG. 1, the neural network training apparatus 100 includes a training data storage 100 and a neural network trainer 120. The training data storage 110 stores training data. The training data may include sequential data, for example, voice data, image data, biometric data, and/or handwriting data. For example, the biometric data may include an EEG, an ECG, an electromyogram (EMG), an electrooculogram (EOG), a pulse, and/or other biometric data known to one of ordinary skill in the art. The training data storage 110 may store training data received from an external source, and provide the stored training data to the neural network trainer 120. The neural network trainer 120 trains the neural network based on the training data.

The neural network trainer 120 may detect a feature value from the training data. For example, the neural network trainer 120 may extract a relative variation varying based on a time, as the feature value. The neural network trainer 120 may sufficiently acquire feature values from the training data, and train the neural network based on the acquired feature values.

For example, when the training data is voice data, the training data storage 110 may store voice data corresponding to "volume-up", "volume-down", and "back to previous channel". The neural network trainer 120 may extract feature values from the voice data, and train the neural network based on the extracted feature values. The voice data may be divided based on a unit of a predetermined time, and the divided voice data may be sequentially input to the neural network.

The neural network trainer 120 may train the neural network based on a training pattern excluding at least one reference hidden node among a plurality of hidden nodes. The training pattern may be continuously settled during a training process of one item of sequential data, i.e., the training of the neural network based on the one item of the sequential data. The neural network may be a recurrent neural network having a connection among hidden nodes of different time intervals, and may include a plurality of hidden layers. In consecutive time intervals, an output value output from a hidden layer of a current time interval may be input to a hidden layer of a subsequent time interval.

The neural network trainer 120 may train the neural network based on remaining hidden nodes obtained by excluding the reference hidden node from the hidden nodes included in the hidden layer of the neural network. The identical reference hidden node may be continuously excluded during the training process of the one item of the sequential data.

The neural network trainer 120 may randomly select the reference hidden node from the hidden nodes. The training pattern excluding the reference hidden node may be identically maintained during the training process of the one item of the sequential data. The neural network trainer 120 may randomly change the training pattern each time the sequential data input as a training target is changed.

The reference hidden node may be a hidden node excluded during the training process of the sequential data. A connection between the reference hidden node and nodes in an upper layer, and a connection between the reference hidden node and hidden nodes in a different time interval, may be ignored. The upper layer may include an output layer or a different hidden layer disposed in an upper position of a hidden layer including the reference hidden node. When a connection between the reference hidden node and another node is ignored, an output of the reference hidden node may not be input to the other node in practice, and the reference hidden node may output a value of 0 as the output to the other node. The other node may include a node of the upper layer or a hidden node of the different time interval. The remaining hidden nodes obtained by excluding the reference hidden node from the hidden nodes included in the hidden layer may be connected with the hidden nodes of the different time interval.

When the training of the one item of the sequential data is terminated, the neural network trainer 120 may change the training pattern, and initiate a training process of another item of the sequential data. The neural network trainer 120 may randomly re-select a reference hidden node from the hidden nodes included in the neural network, and train the neural network based on remaining hidden nodes obtained by excluding the re-selected reference hidden node.

For example, when the neural network is trained to learn "volume-up" of the voice data, the neural network trainer 120 may select a reference hidden node to be excluded from the hidden nodes included in the neural network, and train the neural network to learn "volume-up" of the voice data based on remaining hidden nodes obtained by excluding the selected reference hidden node. While the neural network is training to learn "volume-up" of the voice data, the selected reference hidden node may be continuously ignored. When the training process of "volume-up" of the voice data is terminated, and when a training process of "volume-down" of the voice data corresponding to subsequent sequential data is initiated, the neural network trainer 120 may re-select a reference hidden node to be excluded during the training process, from the hidden nodes. Subsequently, the neural network trainer 120 may perform the training process of "volume-down" of the voice data while continuously ignoring the re-selected reference hidden node.

The neural network trainer 120 may adjust a connection weight applied to the neural network based on a result of the training of the sequential data. The neural network trainer 120 may compute an error by comparing a desired expectation value for the training data and an output value generated from the output layer of the neural network, and may adjust the connection weight applied to the recognition model of the neural network to reduce the error. The neural network trainer 120 may control the neural network to repetitively learn all items of the sequential data included in the training data based on a preset number of repetitions.

The neural network trainer 120 may train the neural network, using a portion of hidden nodes in lieu of all of the hidden nodes, thereby effectively alleviating an issue of overfitting. The overfitting may indicate a phenomenon in which the recognition model of the neural network is excessively adapted to the training data such that a recognition rate for a target to be actually recognized is reduced. Also, by training the neural network, using the portion of the hidden nodes, the neural network trainer 120 may prevent a co-adaptation such that connection weights of the hidden nodes are not similar to one another as a result of the training.

The trained neural network may be used to recognize the sequential data. For example, the recognition model of the neural network may extract a feature value from the sequential data in response to an input of the sequential data, and input the extracted feature value to a classifier so as to output a classification result or a recognition result of the input sequential data.

Figure 2:
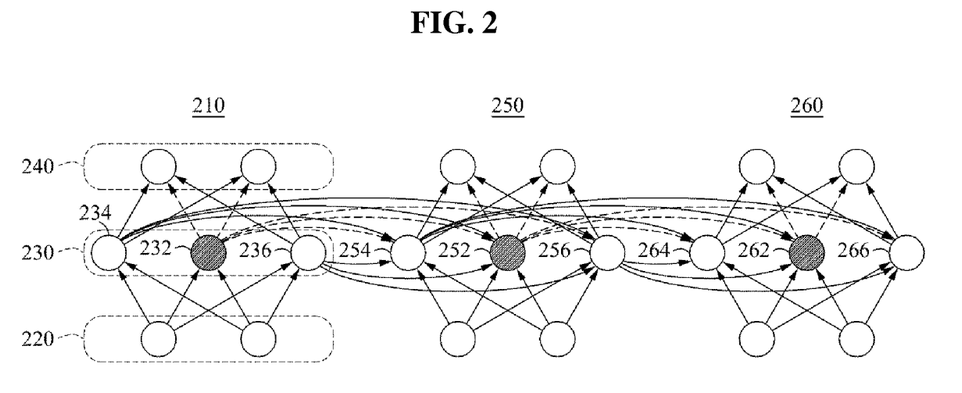
FIGS. 2 and 3 are diagrams illustrating examples of training a neural network based on sequential data in a neural network training apparatus.
Figure 3:
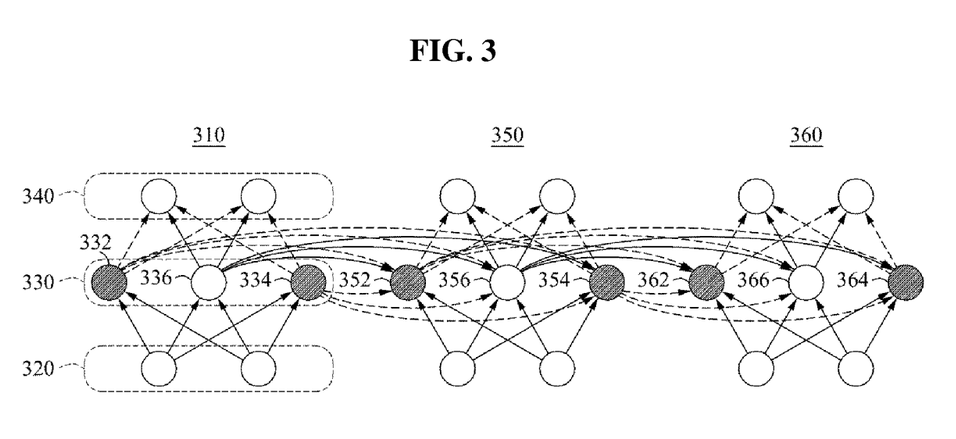

FIGS. 2 and 3 are diagrams illustrating examples of training a neural network based on sequential data in a neural network training apparatus.

FIG. 2 shows operations of the neural network trained to learn a predetermined item of the sequential data. When the sequential data is input as a training target, the sequential data may be divided based on a unit of a predetermined time. A single neural network model may be used when the neural network training apparatus trains the neural network. For example, the divided sequential data may be input to a neural network A in a time sequence for training.

Referring to FIG. 2, each of a training pattern 210, a training pattern 250, and a training pattern 260 indicates a training pattern of a predetermined neural network for a respective timestamp. The training pattern 210 is a training pattern of a previous time interval T−1, the training pattern 250 is a training pattern of a current time interval T, and the training pattern 260 is a training pattern of a subsequent time interval T+1. A single neural network structure is used for training during the previous time interval, the current time interval, and the subsequent time interval.

For example, the neural network includes an input layer 220, a hidden layer, 230, and an output layer 240. A lowest layer is the input layer 220 to which the sequential data is input as the training data, a layer between the input layer 220 and the output layer 240 is the hidden layer 230, and a highest layer is the output layer 240. Each of the input layer 220, the hidden layer 230, and the output layer 240 includes a plurality of nodes. Nodes 232, 234, and 236 included in the hidden layer 230 may be referred to as hidden nodes.

The neural network is connected in a direction from the input layer 220 through the hidden layer 230 to the output layer 240. When the training data is input to each node of the input layer 220, the training data is transferred to the hidden layer 230 through a conversion performed in each node of the input layer 220, and an output is generated in the output layer 240. Although the hidden layer 230 is shown in FIGS. 2 and 3 for increased clarity and conciseness, the neural network may also include a plurality of hidden layers including the hidden layer 230.

The neural network training apparatus inputs the sequential data to the input layer 220 of the neural network, and trains the neural network such that a result of classifying the sequential data is output from the output layer 240 of the neural network. The neural network trained by the neural network training apparatus is a recurrent neural network having a connection among hidden nodes of different time intervals. When the neural network training apparatus trains the neural network to learn the sequential data, each hidden node included in the hidden layer 230 is connected with hidden nodes of the current time interval. An output value of each hidden node in the previous time interval may be input to the hidden nodes of the current time interval.

When training of the sequential data is performed, the neural network training apparatus may train the neural network based on a training pattern excluding a portion of hidden nodes in lieu of all of the hidden nodes. The neural network training apparatus may randomly select a reference hidden node to be excluded or ignored from the hidden nodes in the process of training.

For example, in the training pattern 210 of the previous time interval, the hidden node 232 disposed between the hidden node 234 and the hidden node 236 is selected as a reference hidden node from the hidden nodes 232, 234, and 236 included in the hidden layer 230. Connections between the reference hidden node, for example, the hidden node 232, and nodes included in an upper layer, for example, the output layer 240, are ignored. In addition, connections between the reference hidden node, for example, the hidden node 232, and hidden nodes 252, 254, and 256 of the current time interval are ignored. Also, connections between a reference hidden node, for example, the hidden node 252, of the current time interval and nodes of an upper layer are ignored, and connections between the reference hidden node, for example, the hidden node 252, and hidden nodes 262, 264, and 266 of the subsequent time interval are ignored. In FIG. 2, a connection indicated by a solid line represents a normal connection between nodes, and a connection indicated by a dotted line represents a connection ignored between nodes.

In the previous time interval, the hidden nodes 234 and 236 correspond to remaining hidden nodes obtained by excluding the reference hidden node corresponding to the hidden node 232 from the hidden nodes 232, 234, and 236. The remaining hidden nodes are connected with the nodes included in the upper layer corresponding to the output layer 240 and the hidden nodes 252, 254, 256 of the current time interval. For example, an output generated by each of the remaining hidden nodes in the previous time interval may be input to the nodes in the upper layer corresponding to the output layer 240 and the hidden nodes 252, 254, and 256 of the current time interval. Also, in the current time interval, remaining hidden nodes corresponding to the hidden nodes 254 and 256 obtained by excluding the reference hidden node corresponding to the hidden node 252, are connected with the hidden nodes 262, 264, and 266 of the subsequent time interval.

During a training process of one item of the sequential data, the training pattern excluding the reference hidden node in each time interval may be continuously maintained. For example, if the sequential data is "volume-up" voice data, the neural network training apparatus may perform training of the corresponding voice data based on the training pattern continuously excluding the reference hidden node. The hidden node 232 selected as the reference hidden node of the training pattern 210 in the previous time interval corresponds to the hidden node 252 selected as the reference hidden node of the training pattern 250 in the current time interval and the hidden node 262 selected as the reference hidden node of the training pattern 260 in the subsequent time interval. In each time interval, the training of the sequential data may be performed based on the remaining hidden nodes while the reference hidden node is being excluded.

The neural network training apparatus may compare a desired expectation value and an output value generated from the output layer 240 in each time interval, and may adjust a connection weight of the nodes to reduce a difference between the output value and the expectation value. The neural network training apparatus may train the neural network through the adjustment of the connection weight. For example, the output value may be generated from the output layer 240 through a process in which the training data input to the input layer 220 is multiplied by and added to the connection weight while passing through the hidden layer 230. The generated output value may differ from the desired expectation value, and thus, the neural network training apparatus may update the connection weight to minimize the difference between the generated output value and the desired expectation value.

FIG. 3 illustrates operations of the neural network training apparatus performing a training of another item of the sequential data. The neural network training apparatus may train the neural network by randomly determining a training pattern for each item of the sequential data. A reference hidden node excluded from a training process may be determined for each item of the sequential data. The determined reference hidden node may be continuously selected as the reference hidden node during a training process of corresponding sequential data.

For example, a reference hidden node A may be continuously ignored during a training process of "volume-up" of voice data, and a reference hidden node B may be continuously ignored during a training process of "volume-down" of the voice data. The reference hidden node B may be different from the reference hidden node A. Since the reference hidden node to be excluded from the training process may be randomly selected for each item of the sequential data, an identical reference hidden node may be selected despite a difference in the sequential data.

When the neural network training apparatus is to be trained using the other item of the sequential data after termination of the training of the one item of the sequential data, the neural network training apparatus may change the training pattern. The neural network training apparatus may randomly re-select a reference hidden node to be excluded in a training process, from a plurality of hidden nodes included in a hidden layer.

FIG. 3 illustrates training patterns of the neural network trained to learn the other item of the sequential data. Referring to FIG. 3, a training pattern 310 is a training pattern of a previous time interval, a training pattern 350 is a training pattern of a current time interval, and a training pattern 360 is a training pattern of a subsequent time interval. A single neural network structure is used to train during the previous time interval, the current time interval, and the subsequent time interval. Also, all items of the sequential data may be learned by the single neural network structure.

Similar to FIG. 2, the neural network includes an input layer 320, a hidden layer 330, and an output layer 340. Nodes included in the hidden layer 330 may be referred to as hidden nodes 332, 334, and 336.

In the training pattern 310 of the previous time interval, the hidden nodes 332 and 334 are selected as reference hidden nodes from the hidden nodes 332, 334, and 336 of the hidden layer 330. In this example, the hidden nodes 332 and 334 may correspond to the reference hidden nodes of the previous time interval. Connections between the reference hidden nodes of the previous time interval and nodes included in an upper layer, for example, the output layer 340, are ignored. Connections between the reference hidden nodes of the previous time interval and hidden nodes 352, 354, and 356 of the current time interval are also ignored. Similar to FIG. 2, in FIG. 3, a connection indicated by a solid line represents a normal connection between nodes, and a connection indicated by a dotted line represents a connection ignored between nodes.

In the training pattern 350 of the current time interval, the hidden nodes 352 and 354 are selected as reference hidden nodes from the hidden nodes 352, 354, and 356. In this example, the hidden nodes 352 and 354 may correspond to the reference hidden nodes of the current time interval. Connections between the reference hidden nodes of the current time interval and nodes included in an upper layer are ignored. Connections between the reference hidden nodes of the current time interval and hidden nodes 362, 364, and 366 of the subsequent time interval are also ignored.

In the previous time interval, a remaining hidden node, for example, the hidden node 336, obtained by excluding the reference hidden nodes from the hidden nodes 332, 334, and 336, are connected with the nodes included in the upper layer, for example, the output layer 340, and the hidden nodes 352, 354, and 356 of the current time interval. Also, in the current time interval, a remaining hidden node, for example, the hidden node 356, obtained by excluding the reference hidden nodes from the hidden nodes 352, 354, and 356, are connected with the nodes included in the upper layer and the hidden nodes 362, 364, and 366 of the subsequent time interval.

The neural network training apparatus may select a reference hidden node for each item of sequential data. The selected reference hidden node may be continuously ignored during a time interval in which corresponding sequential data is being used for a training process. Also, when the reference hidden node to be excluded in the training process is selected from hidden nodes included in the neural network, the training may be performed on the neural network in a state of ignoring connections between the reference hidden node and hidden nodes of a subsequent time interval as well as a connection between the reference hidden node and a node included in an upper layer.

Figure 4:
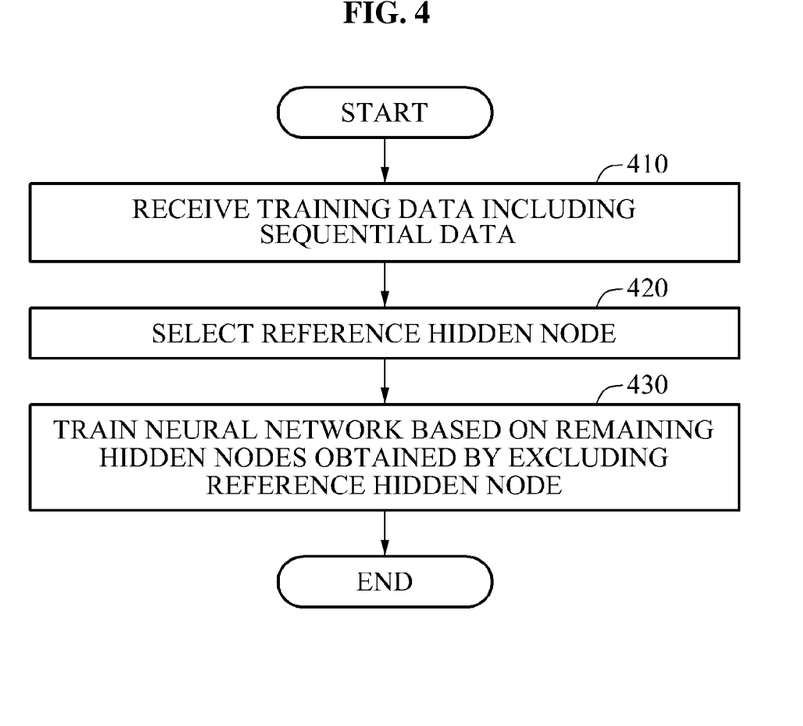
FIG. 4 is a flowchart illustrating an example of a neural network training method.

FIG. 4 is a flowchart illustrating an example of a neural network training method. In operation 410, the neural network training apparatus receives training data including a plurality of items of sequential data. The sequential data may include, for example, voice data, image data, biometric data, handwriting data, and/or other types of data. The neural network training apparatus may store the training data received from an external source, and detect a feature value from the stored training data. The neural network training apparatus may sufficiently acquire feature values from the training data, and train a neural network based on the feature values.

In operation 420, the neural network training apparatus selects at least one reference hidden node from a plurality of hidden nodes included in the neural network. The neural network training apparatus may randomly select the reference hidden node.

In operation 430, the neural network training apparatus trains the neural network based on remaining hidden nodes obtained by excluding the reference hidden node from the hidden nodes, and based on the training data. A training pattern excluding the reference hidden node may be continuously used during a training process of one item of the sequential data, i.e., the training of the neural network based on the one item of the sequential data. During the training process of the one item of the sequential data, the identical reference hidden node may be continuously excluded.

The neural network training apparatus may randomly change the training pattern excluding the reference hidden node, each time the sequential data input as a training target is changed. Connections between the reference hidden node and nodes in an upper layer, and connections between the reference hidden node and hidden nodes in a different time interval may be ignored. The remaining hidden nodes obtained by excluding the reference hidden node from the hidden nodes included in the hidden layer may be connected with the hidden nodes of the different time interval.

When the training process of the one item of the sequential data is terminated, the neural network training apparatus may randomly re-select a reference hidden node from all of the hidden nodes included in the neural network. Subsequently, the neural network training apparatus may train the neural network to learn another item of the sequential data based on remaining hidden nodes obtained by excluding the re-selected reference hidden node from the hidden nodes.

The neural network training apparatus may adjust a connection weight applied to the neural network based on a result of the training process of the sequential data. The neural network training apparatus may compare a desired expectation value and an output value generated from an output layer of the neural network, and may update the connection weight to reduce a difference between the output value and the expectation value. The neural network training apparatus may repetitively train the neural network to learn all of the items of the sequential data included in the training data based on a preset number of repetitions.

Figure 5:
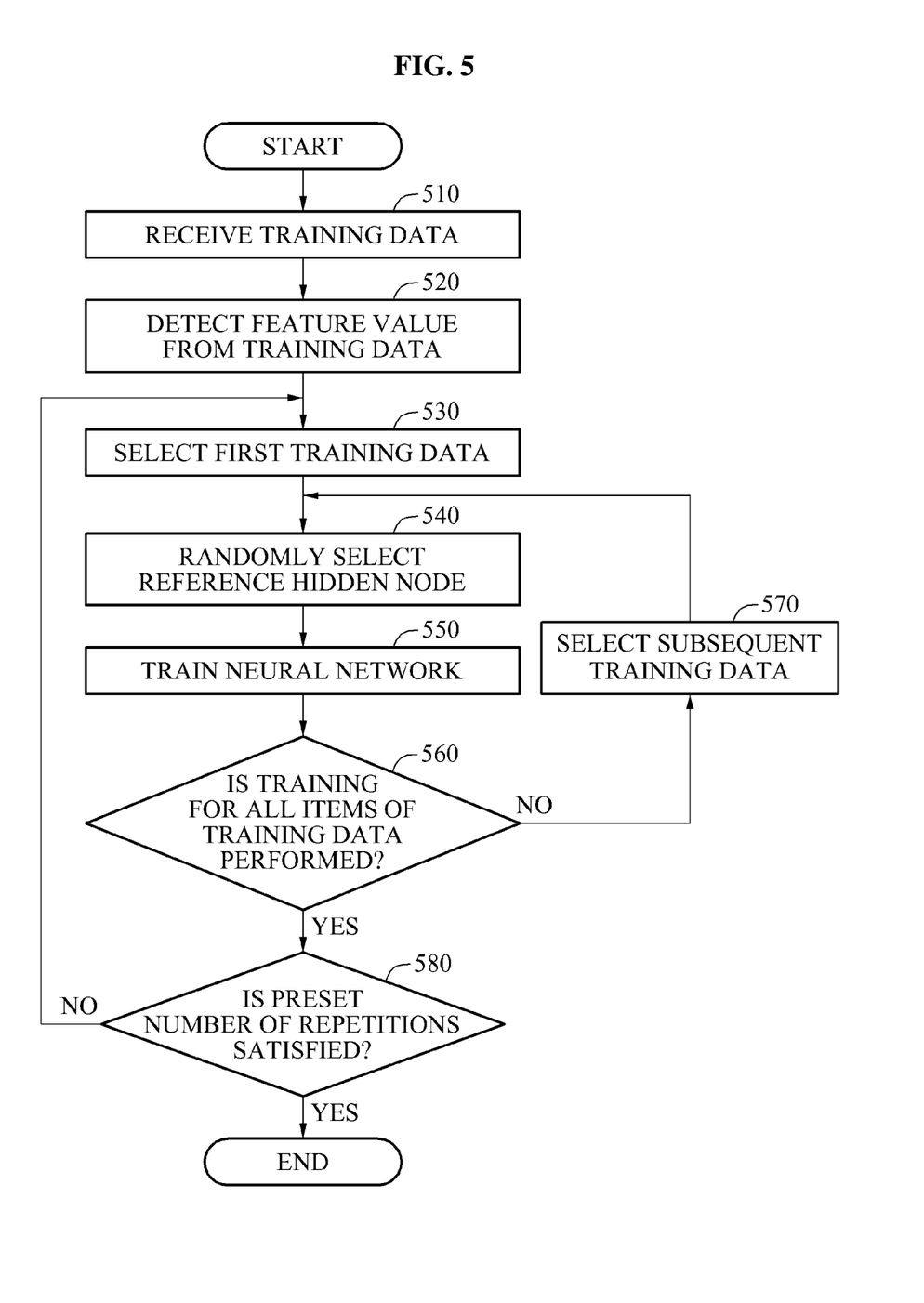
FIG. 5 is a flowchart illustrating another example of a neural network training method.

FIG. 5 is a flowchart illustrating another example of a neural network training method. In operation 510, a neural network training apparatus receives training data. The training data may include, for example, voice data, image data, biometric data, handwriting data, and/or other types of data.

In operation 520, the neural network training apparatus detects a feature value from the training data. For example, the neural network training apparatus may detect feature vectors from the training data, and train the neural network based on the detected feature vectors.

In operation 530, the neural network training apparatus selects first training data to be initially used for training, from the training data. The training data may be classified into the first training data through $N^{th}$ training data, N being a natural number greater than 2, based on a training sequence. Each item of the training data may be independent sequential data. For example, the first training data may be voice data corresponding to "volume-up", second training data may be voice data corresponding to "volume-down", and third training data may be voice data corresponding to "back to previous channel".

In operation 540, the neural network training apparatus randomly selects a reference hidden node to be excluded in a training process, from a plurality of hidden nodes included in the neural network. For example, each of the hidden nodes may be selected to be the reference hidden node at a probability of 50%. A connection between the reference hidden node and nodes in an upper layer and a connection between the reference hidden node and hidden nodes in a different time interval may be ignored.

In operation 550, the neural network training apparatus trains the neural network based on remaining hidden nodes obtained by excluding the reference hidden node from the hidden nodes, and based on the training data. During a training process of one item (e.g., the training of the neural network based on the first training data) of sequential data, a training pattern excluding the reference hidden node may be identically maintained. The neural network training apparatus may update a connection weight applied to the neural network based on result of the training process of the sequential data. The neural network training apparatus may also increment a number of repetitions of the method.

In operation 560, the neural network training apparatus determines whether training for all items of the training data is performed. When the training for all of the items of the training data is determined to be not performed, the neural network training apparatus continues in operation 570. When the training for all of the items of the training data is determined to be performed, the neural network training apparatus continues in operation 580.

In operation 570, the neural network training apparatus selects subsequent training data from the training data. For example, the second training data may be selected as the subsequent training data of the first training data. Subsequently, the neural network training apparatus randomly selects a reference hidden node from the hidden nodes in operation 540, and trains the neural network based on the second training data as an input in operation 550.

In operation 580, the neural network training apparatus determines whether a preset number of repetitions are satisfied, e.g., is equal to the incremented number of repetitions of the method. When the preset number of repetitions is determined to be not satisfied, the neural network training apparatus returns to operation 530. When the preset number of repetitions is determined to be satisfied, the neural network training apparatus terminates the training of the neural network.

Figure 6:
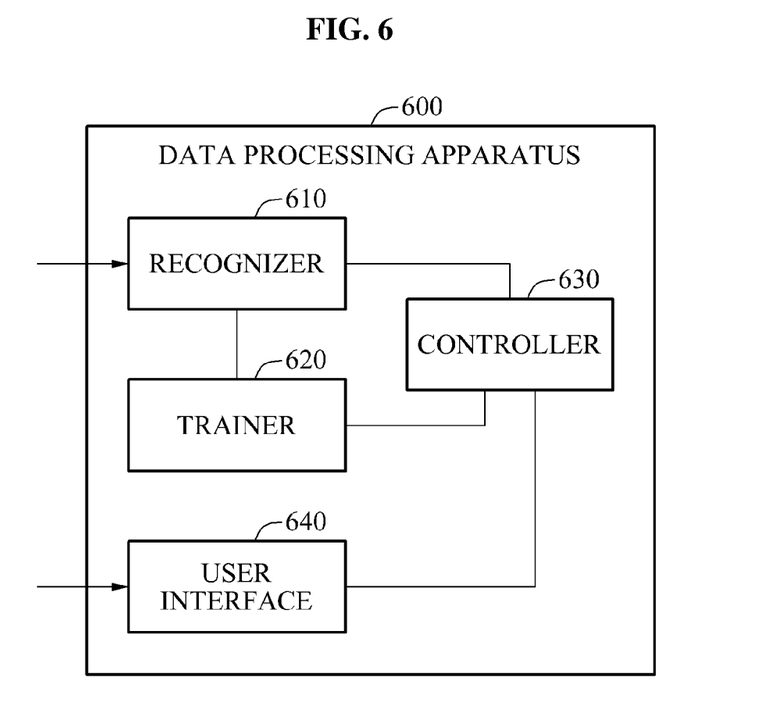
FIG. 6 is a diagram illustrating an example of a data processing apparatus.

FIG. 6 is a diagram illustrating an example of a data processing apparatus 600. The data processing apparatus 600 recognizes sequential data such as image data, biometric data, handwriting data, and/or other types of data, using a recognition model of a neural network. When input sequential data fails to be recognized, the data processing apparatus 600 performs training of the sequential data. The data processing apparatus 600 may continuously improve a recognition performance by continuously performing training of sequential data failing to be recognized.

The data processing apparatus 600 may be an electronic device for recognizing sequential data and performing a corresponding operation. The data processing apparatus 600 may be, for example, a digital television (TV), a desktop computer, a laptop computer, a set-top box, a digital versatile disc (DVD)/Blu-ray disc (BD) player, a DVD recorder, a smartphone, a tablet personal computer (PC), and/or a smart TV.

Referring to FIG. 6, the data processing apparatus 600 includes a recognizer 610, a trainer 620, a controller 630, and a user interface 640. The recognizer 610 recognizes sequential data such as voice data, image data, biometric data, handwriting data, and/or other types of data. For example, the recognizer 610 may recognize voice data input through a microphone and/or image data acquired through a camera. The recognizer 610 includes a recognition model of a neural network, and the neural network may be a recurrent neural network including a plurality of hidden layers. The recognizer 610 may determine contents included in the sequential data, using the recognition model of the neural network, in response to an input of the sequential data.

For example, when "back to previous channel" of the voice data is input to the data processing apparatus 600, the recognizer 610 may analyze the voice data, and output a voice recognition result. The recognizer 610 may divide "back to previous channel" of the voice data into a plurality of frames, and estimate content included in the divided frames based on the recognition model of the neural network. The recognizer 610 may extract feature values by quantifying the input voice data, and compare each of the extracted feature values to a feature value of a voice recognition target. The recognizer 610 may output a final recognition result based on a recognition result for each frame. Based on the voice recognition result, the recognizer 610 may output a recognition result corresponding to "back to previous channel", or output an inappropriate recognition result.

The trainer 620 trains the recognition model of the neural network in response to a control of the controller 630. When the sequential data is determined to be inappropriately recognized by the recognizer 610, the controller 630 controls the trainer 620 to perform training of the sequential data. The controller 630 may control the trainer 620 to perform the training of the sequential data in a case in which the recognizer 610 recognizes the sequential data as well as in a case in which the recognizer 610 fails to recognize the sequential data.

In a process of the training, the trainer 620 trains the recognition model while ignoring a portion of hidden nodes included in the neural network. A hidden node ignored in the training process among the hidden nodes included in a hidden layer of the neural network may be defined as a reference hidden node. The trainer 620 may randomly select the reference hidden node from the hidden nodes, and performs the training while continuously ignoring the selected reference hidden node in a time interval during which training of one item of the sequential data is performed, i.e., the training of the neural network based on the one item of the sequential data. When the reference hidden node is selected from the hidden nodes included in the neural network, the neural network is trained while a connection between the reference hidden node and hidden nodes of a subsequent time interval and a connection between the reference hidden node and nodes included in an upper layer are ignored. During the training process of the sequential data, remaining hidden nodes obtained by excluding the reference hidden node from the hidden nodes are connected with the hidden nodes of the subsequent time interval as well as the nodes included in the upper layer.

The controller 630 controls the recognizer 610 to recognize the sequential data corresponding to a recognition target. When the recognition succeeds, the controller 630 may perform a predetermined operation corresponding to a recognition result. For example, when the voice data input to the data processing apparatus 600 is "back to previous channel", and when the recognizer 610 recognizes the corresponding voice data, the data processing apparatus 600 may change a displayed channel from a current channel to a previous channel.

The user interface 640 receives, from a user, a feedback indicating whether the recognition succeeds. That is, the user interface 640 may receive, from the user, an input indicating whether the sequential data is recognized or not. For example, when the user presses a key indicating the recognition fails or an input is not delivered from the user in response to a voice input or an image acquirement, the data processing apparatus 600 may determine that the recognition fails.

The various elements and methods described above may be implemented using one or more hardware components, one or more software components, or a combination of one or more hardware components and one or more software components.

A hardware component may be, for example, a physical device that physically performs one or more operations, but is not limited thereto. Examples of hardware components include microphones, amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented neural network training method based on training data, the method comprising:
   receiving training data comprising sequential data to be used in a plurality of time intervals of a training of a recurrent neural network;
   selecting, from a hidden layer in the neural network, an identical reference hidden node to be continuously ignored during each of the plurality of time intervals of the training of the neural network, wherein unselected nodes of the layer include remaining nodes; and
   in response to the selecting of the identical reference hidden node, performing the training for each time interval and subsequent time interval among the plurality of time intervals by performing operations based on the sequential data using one or more connections between the remaining nodes of the layer in the time interval and the remaining nodes of the layer in the subsequent time interval, and continuously ignoring one or more recurrent connections between the selected identical reference hidden node of the layer in the time interval and hidden nodes included in the remaining nodes of the layer in the subsequent time interval.

2. The method of claim 1, wherein the reference node is repeatedly excluded during the training of the neural network based on corresponding items of the sequential data.

3. The method of claim 1, wherein the selecting comprises:
   randomly selecting the reference node from nodes of the hidden layer.

4. The method of claim 1, wherein:
   the selecting comprises randomly selecting another reference node from the nodes of the hidden layer in response to the training of the neural network based on the sequential data being terminated; and
   the training of the neural network further comprises training the neural network based on other sequential data of the training data, and based on other remaining nodes obtained by excluding the other reference node from the plural nodes.

5. The method of claim 1, wherein the sequential data comprises any one or any combination of voice data, image data, biometric data, and handwriting data.

6. The method of claim 1, further comprising:
   updating a connection weight applied to the neural network based on a result of the training.

7. The method of claim 1, wherein the training comprises:
   controlling the neural network to repetitively learn the training data based on a predetermined number of repetitions.

8. The method of claim 1, wherein the neural network comprises hidden layers.

9. A non-transitory computer-readable medium instructions, which when executed by a processor, cause the processor to implement the method of claim 1.

10. A processor-implemented neural network training method based on training data, the method comprising:
    receiving training data comprising sequential data to be used in a plurality of time intervals of a training of a recurrent neural network;
    selecting, from a hidden layer in the neural network, an identical reference hidden node to be continuously excluded during each of the plurality of time intervals of the training of the neural network, wherein unselected nodes of the layer include remaining nodes; and
    in response to the selecting of the identical reference hidden node, performing the training for each time interval and subsequent time interval among the plurality of time intervals based on the sequential data and by continuously excluding one or more recurrent connections between the selected identical reference hidden node of the layer in the time interval and one or more of hidden nodes included in the remaining nodes of the layer in the subsequent time interval.

11. The method of claim 10, wherein:
    a remaining node in the time interval, obtained by excluding the reference node from nodes of the hidden layer, is connected the remaining node in the subsequent time interval.

12. The method of claim 10, wherein:
    the selecting comprises randomly selecting another reference node from the nodes in response the training of the neural network based on the sequential data being terminated; and
    the training comprises training the neural network based on other sequential data of the training data, and based on other remaining nodes obtained by excluding the other reference node from the nodes.

13. A non-transitory computer-readable medium instructions, which when executed by a processor, cause the processor to implement the method of claim 10.

14. The method of claim 10, wherein the nodes have set connections with nodes in other time intervals.

15. A neural network training apparatus based on training data, the apparatus comprising:
    a training data storage configured to store training data comprising sequential data to be used in a plurality of time intervals of a training of a recurrent neural network; and
    a processor configured to:
        select, from a layer in the neural network, an identical reference hidden node to be excluded during each of the plurality of time intervals of the training of the neural network, and
        in response to the selecting of the identical reference hidden node, perform the training for each time interval and subsequent time interval among the plurality of time intervals based on the sequential data and by continuously excluding one or more recurrent connections between the selected identical reference hidden node of a layer of the neural network in the time interval and one or more of the hidden nodes of the layer in a subsequent time interval.

16. The apparatus of claim 15, wherein:
    a remaining node in the time interval, obtained by excluding the reference node from the plural hidden nodes, is connected with the remaining node in the subsequent time interval.

17. The apparatus of claim 15, wherein the processor is configured to:
    train the neural network by excluding another reference node of the layer during the training of the neural network based on other sequential data of the training data, in response to the training of the neural network based on the sequential data being terminated.

18. A data processing apparatus comprising:
    a processor configured to:
        select, from a layer in a neural network, an identical reference hidden node to be continuously ignored during each of a plurality of time intervals of a training of the neural network, and
        in response to the selecting of the identical reference hidden node, perform the training for each time interval and subsequent time interval among a the plurality of time intervals based on an item of sequential data by continuously ignoring one or more connections between the identical reference hidden node of a hidden layer in the time interval and one or more nodes of another hidden layer in the time interval, and by continuously ignoring one or more recurrent connections between the identical reference hidden node of the hidden layer in the time interval and one or more hidden nodes of the hidden layer in the subsequent time interval.

19. The data processing apparatus of claim 18, the processor is configured to:
    train the neural network by excluding the reference node from nodes of the layer in each of the time intervals during the training of the neural network based on the item of the sequential data.

20. A processor-implemented neural network training method comprising:
    receiving a training input at an input layer of a neural network;
    selecting, from a hidden layer of the neural network, a reference hidden node to be continuously ignored during each of a plurality of time intervals of a training of the neural network; and
    in response to the selecting of the identical reference hidden node, performing the training for each time interval and subsequent time interval among the plurality of time intervals based the input training data by continuously ignoring one or more connections between the identical reference hidden node of the hidden layer in the time interval and one or more nodes in another hidden layer in the time interval, and by continuously ignoring one or more recurrent connections between the identical reference hidden node of the hidden layer in the time interval and one or more hidden nodes in the hidden layer in a subsequent time interval.

21. Method of claim 20, further comprising:
    receiving a second training input at the input layer, wherein the training comprises training by generating first results; and
    subsequently training the neural network by generating, by nodes of the hidden layer excluding another reference node, second results based on another training input and based on the first results.

* * * * *